Oct. 7, 1969 E. BERMAN 3,471,288
COMBINATION ELECTROSTATIC AND ELECTROCHEMICAL DATA STORAGE PROCESS
Filed April 21, 1966
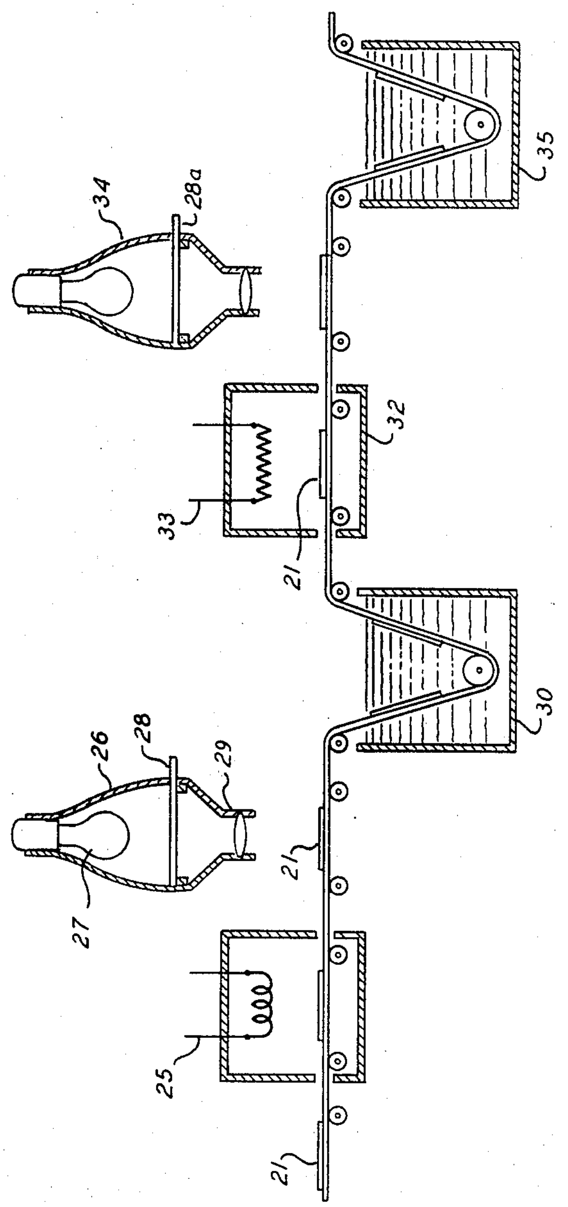
INVENTOR.
ELLIOT BERMAN
BY Robert L. Nathans United States Patent Office 3,471,288

Patented Oct. 7, 1969

3,471,288 COMBINATION ELECTROSTATIC AND ELECTROCHEMICAL DATA STORAGE PROCESS

Elliot Berman, Braintree, Mass., assignor to Itek Corporation, Lexington, Mass., a corporation of Delaware Filed Apr. 21, 1966, Ser. No. 544,251
Int. Cl. G03g
U.S. Cl. 96—1 15 Claims

ABSTRACT OF THE DISCLOSURE

A process for storing and retrieving a plurality of image patterns in a single image storage medium comprising (1) establishing an electrostatic image pattern on a medium comprising a photoconductor material and contacting the surface of the copy medium with an electroscopic material to form a visible image corresponding to the electrostatic image pattern and (2) exposing the copy medium to establish gradients of differential chemical reactivity in the surface of the medium and contacting the exposed surface of the medium with a chemical redox system capable of reacting on contact with the chemically reactive portions to form an irreversible image pattern. The electrostatic image pattern and the gradients of differential chemical reactivity may be produced by a single exposure or in separate exposure steps. Also the sequence of the developing and exposure steps may be varied to suit the particular application. The disclosure also describes apparatus suitable for carrying out the process described above.

This invention relates to data storage systems. More precisely, the invention disclosed herein relates to data storage systems in which information or data comprising different tonal properties can be reliably and accurately stored in the same radiation sensitive medium and retrieved therefrom.

A principal object of the present invention is to provide an improved data storage system.

Another object of the present invention is to provide a data storage system in which information or data, whether in the form of printed matter or in the form of pictorial images, can be stored therein in an accurate and reliable fashion.

Still another object of the present invention is to provide a data storage system in which the data storage media can comprise developed electrostatic image patterns as well as developed metal containing image patterns.

Another specific object of the present invention is to provide improved data storage media, especially useful in the practice of the present invention.

Still another object of the present invention is to provide a novel arrangement of elements capable of effectuating the purposes of the present invention.

Other objects and advantages of the present invention will in part be obvious to those skilled in the art or will in part appear hereinafter.

Accordingly, the present invention comprises a novel integration of several steps as applied to particular data storage media in a particular sequence and relation as well as in a novel combination of structural and processing elements all of which cooperate to accomplish the purposes of the present data storage system.

Data storage media of the present invention

The data storage media of the present invention comprise two essential ingredients: a suitable substrate and a radiation sensitive layer comprising a photoconductor material as a photosensitive component thereof. The substrates are preferably conductive in nature but non-conductive substrates can be suitably employed. Accordingly, said substrate can be flexible or rigid and fabricated of such materials as paper, metal foil or the like which are presently used in the electrophotographic art.

The most preferred media of the present invention comprise radiation sensitive layers having zinc oxide or titanium oxide and especially mixtures thereof as the photoconductor materials. However, suitable radiation sensitive layers can comprise other inorganic photoconductor materials such as cadmium sulfide, indium oxide, zinc telluride or other compounds of a metal and an element of Group VI–A and the like or organic photoconductor materials such as benzidine, anthracene or a hetrocyclic compound such as aryl furans, aryl thiophenes or aryl pyrroles. Further the radiation sensitive layer can comprise other photoconductor materials or combinations thereof as well as those above mentioned to impart specifically desired properties to the layer.

Radiation sensitive layers of media of the present invention also can contain electrically insulating binding agents which are known to the art. When the photoconductor material is in the form of a particulate solid, the lowest practical ratio of binder to solids is preferred. Suitable binders include the natural, modified-natural or synthetic polymeric materials normally useful in the art as binders. Representative natural binders include gum arabic, micro-crystalline waxes, dommar resins, manila gum and others which could be mentioned. Representative modified-natural binders include ethyl cellulose, cellulose diacetate, ethyl cellulose stearate, modified colophonium resins, cellulose triacetate and the like. Representative synthetic binder materials include the polymers and copolymers of monoolefins such as the polymers of ethylene, stryene, vinylacetate and the like. Other specific synthetic binders include the polyvinyl acetals of formaldehyde, acetaldehyde, or butyraldehyde, polyethylene glycol esters, diethylene glycol polyesters, polyacrylic acid esters and polymethacrylic acid esters, glyceryl polyesters, alkyd resins and the like.

Additional materials which can be included in said layers include suitable plasticizers such as tricresylphosphate, triphenylphosphate or the like in amounts sufficient to impart the desired properties to said layers. Also, other ingredients used in the coating art to improve the overall quality of the layer can be included. Such ingredients include antioxidants and like stabilizing agents. Also, dyes or other sensitizing materials which can improve or adjust the spectral response of the photosensitive material can be incorporated therein.

In practice, media of the present invention are conveniently prepared by dissolving or dispersing the photoconductor material and the binder as well as any of the aforementioned ingredients in a suitable solvent for one or more of the ingredients. Suitable solvents include water and organic materials such as benzene, methylene chloride, dioxane, dimethyl formamide or glycol monomethyl-ether, or a mixture of two or more suitable solvents. The solution or dispersion thus obtained is uniformly spread as a thin layer on a suitable substrate by any of the coating techniques known to the art, for example, by spraying, brushing or rolling techniques.

The steps of the invention

The steps of the present invention will be better understood by reference to FIGURE 1, which illustrates in schematic form, an arrangement of the apparatus suitable for accomplishing the purposes of the present invention.

Referring now to FIGURE 1, the surface of medium 21, having a radiation sensitive layer comprising a photoconductor material, is first uniformly electrostatically charged positively or negatively by suitable means, for example, a corona discharge as from a Telsa coil 25. The so charged medium 21 is next conveyed to exposure means 26, where a latent electrostatic image pattern is obtained on exposure to an image pattern of activating radiation. Means 26 includes source 27 of activating radiation, appropriate optical systems 29 for focusing purposes and transparency 28 comprising an information image pattern desired to be stored. The image pattern of transparency 28 generally comprises data or information in line copy form. For example, said pattern can represent printed matter or a series of lines. After exposure, medium 21 is next conveyed to developing means 30 which contains an electroscopic material capable of rendering the latent electrostatic image pattern visible. In the practice of the present invention, I prefer to use liquid toners. Liquid toners are well known to the art of electrophotography and comprise finely divided, colored electroscopic substances which are present in an electrically insulating liquid. It is to be understood that finely divided electroscopic colored substances can also be applied directly to medium 21 in the form of an aerosol or by merely dusting said substances over the exposed surface of medium 21. After contacting medium 21 with a suitable electroscopic material, a fixing step is oftentimes required. Accordingly, medium 21 can be conveyed to fixing means 32 which, for example, can include a light shielded electric heating coil 33. Coil 33 is a source of infrared radiation, which in the practice of the present invention, both fixes the electrostatic image on medium 21 and at the same time uniformly deactivates the photoconductive material of medium 21. This uniform deactivation is desirable in the practice of the present invention since medium 21 is rendered uniformly receptive to a second source of activating radiation and high quality images are assured.

Medium 21 now containing a developed and fixed electrostatic image pattern is next conveyed to exposure means 34 which comprises a suitable light source as well as transparency 28*a* which contains a second image pattern, for example, a pictorial image pattern to be stored in medium 21. It is to be understood that the second exposure of medium 21 can occur at a time and/or space remote from that at which development of the electrostatic image occurred. As disclosed in commonly owned copending U.S. patent application, Ser. No. 199,211, filed May 14, 1962, to E. Berman et al., now abandoned in favor of continuation-in-part application Ser. No. 728,869 filed May 2, 1968, exposure of media of the present invention renders same chemically reactive in the light activated portions. Thus, a reversible image pattern is established in said medium. Said reversible image can be converted to an irreversible form by conveying medium 21 to a second development means 35 which contains a redox system capable of preferentially reacting on contact with the light activated portions of medium 21 to deposit thereon species which can be interpreted directly or subsequently by visual readout.

The most preferred redox systems are those solutions containing metal ions which can be reduced at least as easily as copper ions. Accordingly, suitable redox systems comprise compounds of copper, silver, mercury, gold. The ions are reduced on contact with the light activated, chemically reactive portions of the medium 21, thereby establishing an irreversible image pattern. Said pattern can be visible or latent depending upon the strength of exposure means 34 and the duration of exposure. More often than not said image pattern is latent and an amplification step is used to make the image visible. Such latent irreversible image patterns can be amplified by contact with developer systems, for example, such as those comprising silver ion in admixture with a suitable reducing agent such as hydroquinone. Developer systems of this type tend to deposit further free metal on a surface where free metal is already present, and can be used in the present invention to amplify said irreversible image patterns.

Other developer systems which are especially suitable in the practice of the present invention include those disclosed in commonly owned copending U.S. patent application, Ser. No. 360,112 filed Apr. 15, 1964, by E. Berman et al. which is incorporated herein by reference.

Still other specific developer systems suitable in the practice of my invention are disclosed in U.S. Patent No. 2,750,292 granted June 12, 1956, to Dippel et al., for example, which teaches methods and materials for formation of colored images by the amplification of latent images of metals such as mercury, silver, gold and platinum. Alternatively, the aforementioned patent discloses techniques for the direct production of dye images in situ with latent metal images.

It is to be understood that the accomplishments of the present invention do not depend necessarily on the sequence of steps described in the discussion of FIGURE 1. For example, the preferred sequence of FIGURE 1 can be modified with medium 21 being exposed first to the image pattern comprising tonal relationships. The exposed medium then is developed such as in development means 35. Thereafter, the exposed surface of the medium can be electrostatically charged, exposed to a line copy image pattern, and developed in development means similar to development means 30 of FIGURE 1. Also, the medium can be exposed sequentially to a plurality of line copy image patterns as well as to a plurality of patterns comprising tonal relationships. For example, medium 21 can be exposed sequentially to two or more line copy image patterns and developed after each exposure with toners of different colors. Thereafter, said medium can be exposed to an image pattern comprising tonal relationships and developed in accordance with the methods disclosed in FIGURE 1. It is also to be understood that the image patterns which are subsequently developed as metal image patterns and as electrostatic image patterns can be stored in a medium of the present invention by one exposure, that is to say, sequential exposures are not necessarily required in every instance. An example of this aspect of my invention is illustrated in Example 4 hereinafter.

In any event, it will be obvious that the data storage system of the present invention is highly versatile since the ultimate medium produced thereby comprises developed electrostatic image patterns in combination with metal image patterns. Moreover, said developed electrostatic image patterns can be superposed on or overlay the entire metal image pattern or only a selected portion thereof. Quite surprisingly, the metal containing image pattern is easily discernible under the developed electrostatic image pattern, especially when advantage is taken of the known "halo effect" which is oftentimes apparent in the development of electrostatic image patterns.

The following examples set forh in detailed fashion, various embodiments of my invention. It is to be understood that the following examples are illustrative in nature and in no way are they to be construed so as to limit my invention beyond those limitations expressly set forth in the present specification or in the claims which appear hereinafter.

Example 1

A data storage medium suitable in the practice of the present invention is prepared as follows: 85 grams of zinc oxide having an average particle size of about 0.4 micron and 15 grams of a finely divided titanium dioxide having an average particle size of about 0.03 micron were added to a solution comprising about 25 grams of short oil alkyd resin—Aroplax 6006×50—in acetone. The dispersion is well agitated and then coated on a conventional electrostatic base stock and dried.

The surface of the medium comprising the radiation sensitive coating is charged with a 5000 volt corona discharge and exposed to a tungsten light through a transparency having an image pattern corresponding to a plurality of ordinates. The exposed medium is then washed in a red toner comprising an electroscopic red pigment in ligroin. The electrostatic image pattern so obtained is fixed by heating the medium by means of an infrared lamp.

After heating, the medium is exposed to a 100 watt "Hanovia" mercury lamp through a transparency comprising an image pattern of an aerial photograph. The medium is then immersed in a saturated solution of silver nitrate in ethanol which also contained about 5 grams per liter of citric acid. Thereafter, the medium is immersed in an ethanolic developer solution cmoprising 10 grams of phenidone per liter of ethanol and 20 grams of citric acid per liter. The medium is then fixed in a conventional fixer—Kodak F–5—and washed.

The resulting medium comprises a continuous tone silver image pattern superposed on an electrostatic image pattern. Suitable results can also be obtained when media comprising other mixtures of zinc oxide and titanium dioxide are involved. For example, suitable mixtures include those in which zinc oxide represents from about 5 to about 95 percent by weight of the mixture, but mixtures comprising zinc oxide in amounts from about 50 to 90 percent by weight are especially preferred.

Example 2

About 60 grams of a zinc oxide having an average particle diameter of about 0.1 micron are mixed with a solution comprising about 15 grams of a partially carboxylated polyvinyl acetate binder material in acetone.

The photoconductor containing dispersion is then coated about 4 mils thick on a conventional electrostatic base stock and dried.

The surface of the medium comprising the radiation sensitive coating is charged with a 5000 volt corona discharge thereby rendering the entire surface thereof attractive to an electroscopic material. A liquid toner comprising a green pigment and ligroin is then applied to the charged surface and said green pigment adheres uniformly to the entire surface of the medium.

The medium is then exposed to a 100 watt "Hanovia" mercury lamp through a transparency comprising an image pattern containing tonal relationships. After exposure, the medium was developed in accordance with the procedure set forth in Example 1. The continuous tone image was easily discernible although the electroscopic powder covered the entire surface of the medium.

Example 3

The following example illustrates a method for producing colored image patterns in accordance with the practice of the present invention. The surface of a medium similar to that of Example 1 is electrostatically charged with a 5000 volt corona discharge and exposed to a tungsten light through a transparency having an image pattern of an aerial photograph of a lake and surrounding land. However, the transparency is masked so that upon exposure, an electrostatic image pattern corresponding to the lake only is obtained in the medium. The so exposed medium is then washed in a blue toner comprising an electroscopic blue pigment and ligroin. The electrostatic image pattern so obtained is fixed by heating the medium by means of an infrared lamp.

After heating, the medium is exposed to a 100 watt "Hanovia" mercury lamp through the same transparency; but in this case, all portions of the transparency are available for exposure. Also, the relative positions of the medium and transparency are adjusted so that the portion of the medium comprising the developed electrostatic image pattern is in registry with that portion of the transparency which comprises the image pattern corresponding to the lake. After exposure, the medium is immersed in a saturated solution of silver nitrate in ethanol which also contains about 5 grams per liter of citric acid. Thereafter, the medium is immersed in a solution comprising 10 grams of phenidone per liter of ethanol and 20 grams of citric acid per liter. The medium is then fixed and washed. The resulting medium comprises a continuous tone silver image pattern but that portion thereof which corresponds to the lake is colored. Also, by reason of the "halo effect," the boundaries of said lake are extremely well defined.

Example 4

The coated surface of a medium prepared in accordance with the procedure of Example 2 is electrostatically charged with a 5000 volt corona discharge. Said medium is then exposed to a 100 watt "Hanovia" mercury lamp through a transparency comprising an image pattern.

The medium is then washed in a red toner and an electrostatic image pattern is developed in the non-exposed pattern.

The medium is then immersed in a saturated solution of silver nitrate in ethanol which also contained about 5 grams per liter of citric acid. Thereafter, the medium is immersed in a solution of 15 grams of phenidone per liter of methanol and 20 grams of citric acid per liter.

The medium is then fixed and washed and comprises a developed electrostatic image pattern in the non-exposed areas and a metallic image pattern in the exposed areas.

Many modifications of the details of the above examples, offered for the purposes of illustrating my invention are included within the spirit and scope of the invention defined in the appended claims.

Having described my invention together with preferred embodiments thereof as well as manners of practicing same, what I declare as new and desire to secure by U.S. Letters Patent is as follows:

1. A process for storing and retrieving a plurality of image patterns in a single image storage medium which comprises the steps of:

(a) establishing an electrostatic image pattern on the coated surface of a medium comprising a substrate and a radiation sensitive coating which comprises a photoconductor material;

(b) contacting said surface with an electroscopic material to form a visible image corresponding to said electrostatic image pattern;

(c) exposing said coated surface of said image storage medium to a pattern of radiant energy to establish gradients of differential chemical reactivity in said surface corresponding to the pattern of radiant energy applied thereto; and (d) contacting said exposed surface of said medium with a chemical redox system capable of reacting on contact with the chemicallly reactive portions to form a visible image pattern.

2. The process of claim 1 wherein said radiation sensitive coating comprises zinc oxide.

3. The process of claim 1 wherein said radiation sensitive coating comprises titanium dioxide.

4. The process of claim 1 wherein said radiation sensitive coating comprises a mixture of zinc oxide and titanium dioxide.

5. The process of claim 1 wherein said chemical redox system comprises a solution comprising a metal ion which is reduced at least as easily as copper ion.

6. The process of claim 1 wherein step (d), said medium is contacted with a solution comprising a metal ion which is reduced at least as easily as copper ion and with a solution comprising a reducing agent for said compound.

7. The process of claim 1 wherein in step (d), said medium is contacted with a solution comprising a compound of silver and with a solution comprising an organic reducing agent for said compound and an acid.

8. The process of claim 1 wherein the sequence of steps comprises steps (c), (d), (a), and (b).

9. A process for producing an image which comprises the steps of:

(a) establishing an electrostatic charge on the coated surface of a medium comprising a substrate and a radiation sensitive coating which comprises a photoconductor material;

(b) exposing said surface to a pattern of radiant energy modified by an image pattern thereby establishing an electrostatic image pattern in the non-exposed portions of said medium and rendering said exposed portions chemically reactive;

(c) contacting said exposed surface with an electroscopic material to form a visible image pattern conforming to said electrostatic image pattern; and (d) contacting said exposed surface of said medium with a chemical redox system capable of reacting on contact with the chemically reactive portions to form a visible image pattern.

10. The process of claim 9 wherein said chemical redox system comprises a solution of a compound chosen from the group consisting of silver, gold, copper, mercury and mixtures of these.

11. The process of claim 9 wherein in step (d), said medium is contacted with a solution of a compound chosen from the group consisting of silver, gold, copper, mercury and mixtures of these and then with a solution comprising a reducing agent for said compound.

12. The process of claim 9 wherein in step (d), said medium is contacted with a solution comprising a compound of silver and then with a solution comprising an organic reducing agent for said compound and an acid.

13. The process of claim 9 wherein step (d) precedes step (c).

14. A process for storing and retrieving a plurality of image patterns in a single storage medium comprising the steps of:

(a) establishing an electrostatic image pattern in a copy medium comprising a photoconductor material;

(b) imagewise exposing the copy medium to thereby activate exposed portions of the medium such that the exposed portions are capable of inducing chemical reaction when contacted with a chemical redox system;

(c) contacting the copy medium with an electroscopic material to form a visible image corresponding to the electrostatic image pattern;

(d) contacting at least the activated portions of the copy medium which are capable of producing chemical reaction with a chemical redox system to form an irreversible image pattern.

15. A process as in claim 14 wherein the exposure step of step (b) is the same exposure step used in step (a) to establish an electrostatic image pattern.

References Cited

UNITED STATES PATENTS

| | | | |
|---|---|---|---|
| 3,121,006 | 2/1964 | Middleton et al. | 96—1 |
| 3,380,823 | 4/1968 | Gold | 96—27 |
| 3,390,989 | 7/1968 | Berman | 96—27 |

GEORGE F. LESMES, Primary Examiner

JOHN C. COOPER III, Assistant Examiner

U.S. Cl. X.R.

96—27, 48; 117—37, 175